United States Patent
Humburg et al.

(10) Patent No.: US 10,125,776 B2
(45) Date of Patent: Nov. 13, 2018

(54) BLOWER HOUSING, ESPECIALLY FOR A BLOWER FOR A VEHICLE HEATER

(71) Applicant: Eberspächer Climate Control Systems GmbH & Co. KG, Esslingen (DE)

(72) Inventors: Michael Humburg, Göppingen (DE); Hermann Eppler, Balingen (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 301 days.

(21) Appl. No.: 14/848,883

(22) Filed: Sep. 9, 2015

(65) Prior Publication Data

US 2016/0069353 A1 Mar. 10, 2016

(30) Foreign Application Priority Data

Sep. 10, 2014 (DE) .......................... 10 2014 218 115

(51) Int. Cl.
*F04D 25/06* (2006.01)
*F04D 17/10* (2006.01)
(Continued)

(52) U.S. Cl.
CPC ............. *F04D 25/06* (2013.01); *F04D 17/10* (2013.01); *F04D 23/008* (2013.01); *F04D 25/068* (2013.01); *F04D 25/0693* (2013.01); *F04D 29/023* (2013.01); *F04D 29/403* (2013.01); *F04D 29/601* (2013.01); *H02K 5/225* (2013.01); *H02K 7/14* (2013.01)

(58) Field of Classification Search
CPC ..... F04D 13/06; B60H 1/2203; B60H 1/2206; B60H 1/2212
See application file for complete search history.

(56) References Cited

U.S. PATENT DOCUMENTS 5,727,730 A * 3/1998 Habijanec ............ B60H 1/2212
126/110 A
5,749,516 A * 5/1998 Humburg .............. F24H 9/2035
237/12.3 C
(Continued)

FOREIGN PATENT DOCUMENTS

DE 199 23 298 C1 1/2001
DE 10 2004 036 419 A1 3/2006
(Continued)

*Primary Examiner* — Patrick Hamo
(74) *Attorney, Agent, or Firm* — McGlew and Tuttle, P.C.

(57) ABSTRACT

A blower housing includes a motor housing (14) with a circumferential wall (18) having a first bottom area (22) in a first axial end area (20), a motor housing cover (16) capable of being connected to the motor housing (14) in a second axial end area and a second bottom area (30). A contacting arrangement (42) is provided on the motor housing cover (16) for the electrical contacting of an electric motor (26) to be arranged in the blower housing (12). The contacting arrangement (42) includes a first contacting area (44) first contacting formation (46) at least on one side of the motor housing cover (16) to be positioned facing an interior (24) of the motor housing (12). A second contacting area (64) second contacting formation is exposed to the outside. A strip conductor formation (59) conductively connects the first contacting formation (64) to the second contacting formation (66).

20 Claims, 3 Drawing Sheets

(51) Int. Cl.
*F04D 29/40* (2006.01)
*H02K 5/22* (2006.01)
*F04D 23/00* (2006.01)
*F04D 29/02* (2006.01)
*F04D 29/60* (2006.01)
*H02K 7/14* (2006.01)

(56) References Cited

U.S. PATENT DOCUMENTS

| | | | |
|---|---|---|---|
| 6,743,012 B2* | 6/2004 | Wolf | B60H 1/2212 165/41 |
| 7,270,098 B2* | 9/2007 | Young | B60H 1/2206 123/142.5 R |
| 7,594,484 B2* | 9/2009 | Lavender | F01P 5/06 123/198 E |
| 2008/0304988 A1* | 12/2008 | Asaka | B60S 1/50 417/500 |
| 2011/0247891 A1* | 10/2011 | Meyer | B60R 13/08 180/443 |
| 2012/0090440 A1* | 4/2012 | Koegel | B23D 59/006 83/100 |
| 2012/0241529 A1* | 9/2012 | Wetzl | F04D 25/166 237/12.3 C |

FOREIGN PATENT DOCUMENTS

| | | |
|---|---|---|
| DE | 10 2009 001 808 A1 | 9/2010 |
| DE | 10 2010 025 689 A1 | 1/2012 |
| DE | 10 2010 041 139 A1 | 3/2012 |
| EP | 0 948 116 A2 | 10/1999 |
| EP | 1 458 078 A1 | 9/2004 |
| EP | 2 212 985 B1 | 5/2011 |

\* cited by examiner

BLOWER HOUSING, ESPECIALLY FOR A BLOWER FOR A VEHICLE HEATER

CROSS REFERENCE TO RELATED APPLICATIONS

This application claims the benefit of priority under 35 U.S.C. § 119 of German Patent Application 10 2014 218 115.1 filed Sep. 10, 2014, the entire contents of which are incorporated herein by reference.

FIELD OF THE INVENTION

The present invention pertains to a blower housing, and especially for a blower for a vehicle heater, which blower housing comprises a motor housing with a circumferential wall and a first base wall in a first axial end area of the circumferential wall.

BACKGROUND OF THE INVENTION

Blowers used in vehicle heaters for the delivery of combustion air may be designed as so-called side channel blowers. An electric motor with a stator and a rotor and with a rotor shaft associated with same is arranged in an interior, which is enclosed by a circumferential wall, of a motor housing. At a first axial end area of the circumferential wall, a first base wall is provided, which axially defines the interior of the motor housing, on the one hand, and extends radially beyond the circumferential wall, on the other hand. A ring-like delivery channel, which is overlapped by a delivery wheel supported on the rotor shaft, is arranged in this base wall on the axial side facing away from the circumferential wall. During the rotary operation of the delivery wheel, air is thus delivered with the buildup of pressure along the ring-like delivery channel. The air entering an entry area in the delivery channel is conducted out of the delivery channel in an interrupter area interrupting the ring-like delivery channel in the circumferential direction and is conducted, for example, in the direction towards a combustion chamber of a fuel-operated vehicle heater.

SUMMARY OF THE INVENTION

An object of the present invention is to provide a blower housing, and especially for a blower for a vehicle heater, in which, with a simple construction, the possibility is created to electrically contact an electric motor of a blower arranged in the blower housing for connection to an actuating device.

According to the present invention, this object is accomplished by a blower housing, especially a blower housing for a blower for a vehicle heater, comprising a motor housing with a circumferential wall and with a first bottom area in a first axial end area of the circumferential wall, a motor housing cover capable of being connected to the motor housing in a second axial end area of the circumferential wall and providing a second bottom area, a contacting arrangement for the electric contacting of an electric motor to be arranged in the blower housing on the motor housing cover, and in a first contacting area, the contacting arrangement comprises a first contacting formation at least on one side of the motor housing cover to be positioned facing an interior of the motor housing, comprises a second contacting formation in a second contacting area exposed to the outside, as well as comprises a strip conductor formation connecting the first contacting formation to the second contacting formation in a conductive manner.

In the blower housing constructed according to the present invention, the electric contacting of the electric motor to be arranged in an interior of the motor housing or the blower housing takes place via the motor housing cover to be connected axially to the motor housing. Preferably, the structure in this case is such that when mounting the motor housing cover on the motor housing, the first contacting area is brought into contact with motor contact elements provided on an electric motor. In the second contacting area, which is exposed to the outside, i.e., to the outside in relation to the interior of the motor housing, the electric connection to an actuating device can take place, for example, via a connector plug.

In order to protect the contacting arrangement against external effects and damage, on the one hand, and to be able to ensure an easy manageability, on the other hand, it is suggested that the contacting arrangement be embedded at least partially in a material of which the motor housing cover is made. Embedded in the sense of the present invention means that the embedded assembly unit is enclosed, for example, recast, by the material of which the motor housing is made during the manufacture of this motor housing and thus after solidification of the material of which the motor housing cover is made, it is rigidly integrated into same due to the embedding.

To be able to ensure a reliable electric contacting of all motor contact elements of an electric motor, on the one hand, and also to be able to provide a variability in the electric contacting, on the other hand, it is suggested that the first contacting formation comprise a plurality of first contact elements, that the second contacting formation comprise at least one second contact element in association with each first contact element, and that the strip conductor formation, in association with each first contact element, comprise a strip conductor connecting this first contact element to at least one associated second contact element.

A structure which is especially simple to accomplish can be obtained by at least one strip conductor element being designed as being integral with an associated first contact element or/and at least one associated second contact element, and preferably by separating out from a strip conductor material blank, and for the simple manufacture of a respective electric contact, provisions may be made for at least one first contact element or/and at least one second contact element to comprise a plug contact element.

To be able to provide the second contacting area where the electric connection, for example, to an actuating device or to a connector plug connecting same is also especially advantageous in a vehicle heater for structural reasons, it is also suggested that the motor housing cover comprise a connection web connecting the first contacting area to the second contacting area and extending at least in some areas along the circumferential wall with the motor housing cover mounted on the motor housing. Provisions may further be made thereby for the second contacting area to comprise a contact plug connection area at an end area of the connection web lying at a distance from the second bottom area.

The simple and compact structure of the blower housing according to the present invention can also be supported by the second bottom area of the motor housing cover being designed as integral with the connection web and with a contact plug connection area, and by the motor housing cover being advantageously designed as a plastic-metal composite component, i.e., in plastic-metal composite technology.

A high variability in the installation or in the connectability to an actuating device can preferably be further provided by the motor housing cover being able to be connected to the motor housing in a plurality of mounting positions rotated in relation to one another about a motor housing longitudinal axis.

The present invention also pertains to a blower, especially for a vehicle heater, comprising a blower housing constructed according to the present invention, as well as an electric motor with a stator and with a rotor arranged in the blower housing. The rotor may comprise a rotor shaft. This rotor shaft may preferably be mounted at the first bottom area or/and at the second bottom area, and in case of mounting at the second bottom area, the motor housing cover can assume not only the functionality of the closing of the interior of the motor housing and the electric contacting, but also the mounting.

In order to design the blower in the manner of a side channel blower, it is suggested that, in the area of the first axial end area of the circumferential wall, the first bottom area extend radially beyond the circumferential wall in relation to a motor housing longitudinal axis, that a delivery channel extending in a ring-like manner about the motor housing longitudinal axis be provided in the first base wall on an axial side of the first base wall facing away from the circumferential wall, and that a delivery wheel overlapping the delivery channel be supported on a rotor shaft traversing the first base wall.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
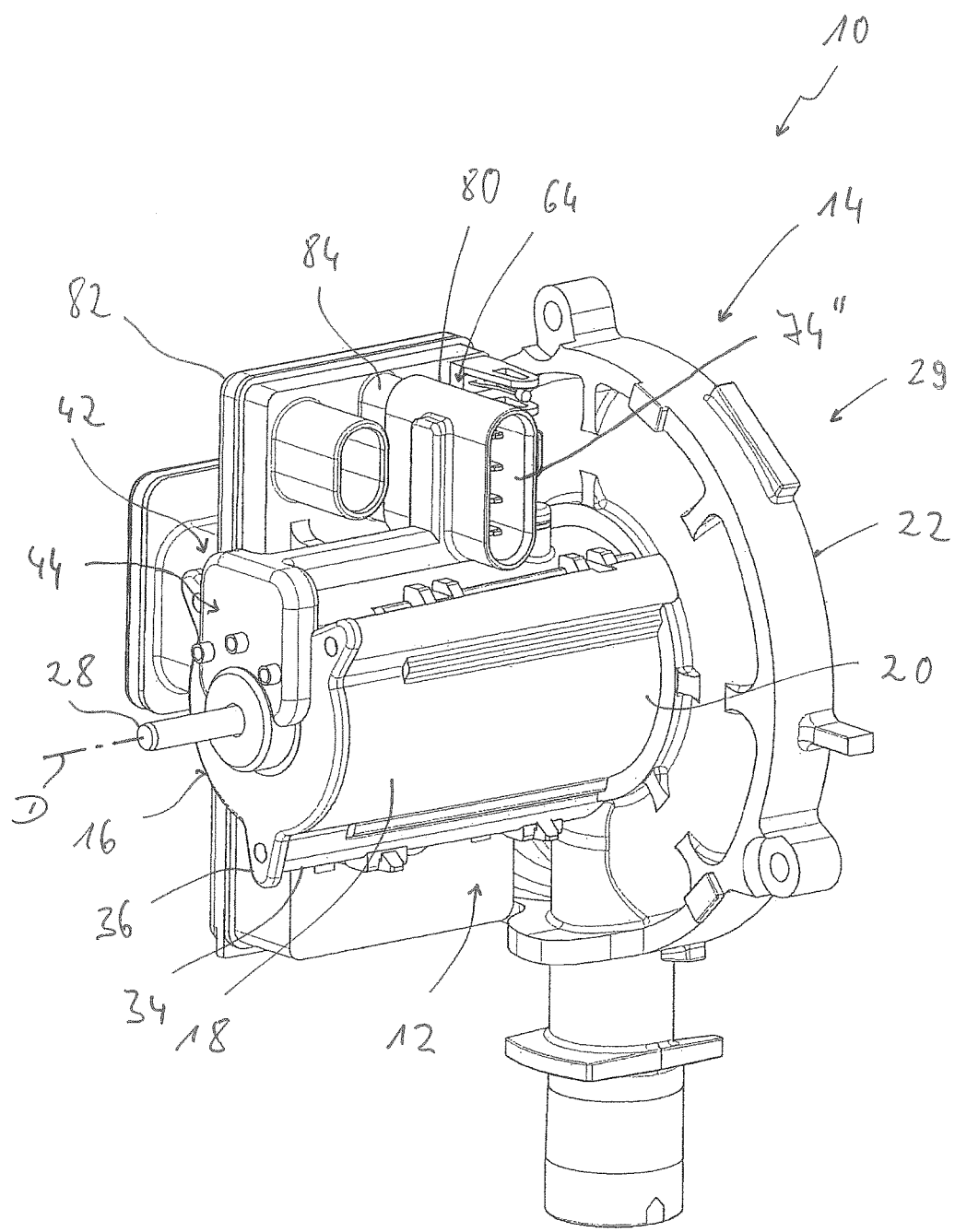
FIG. 1 is a perspective view of a blower for a vehicle heater.
Figure 2:
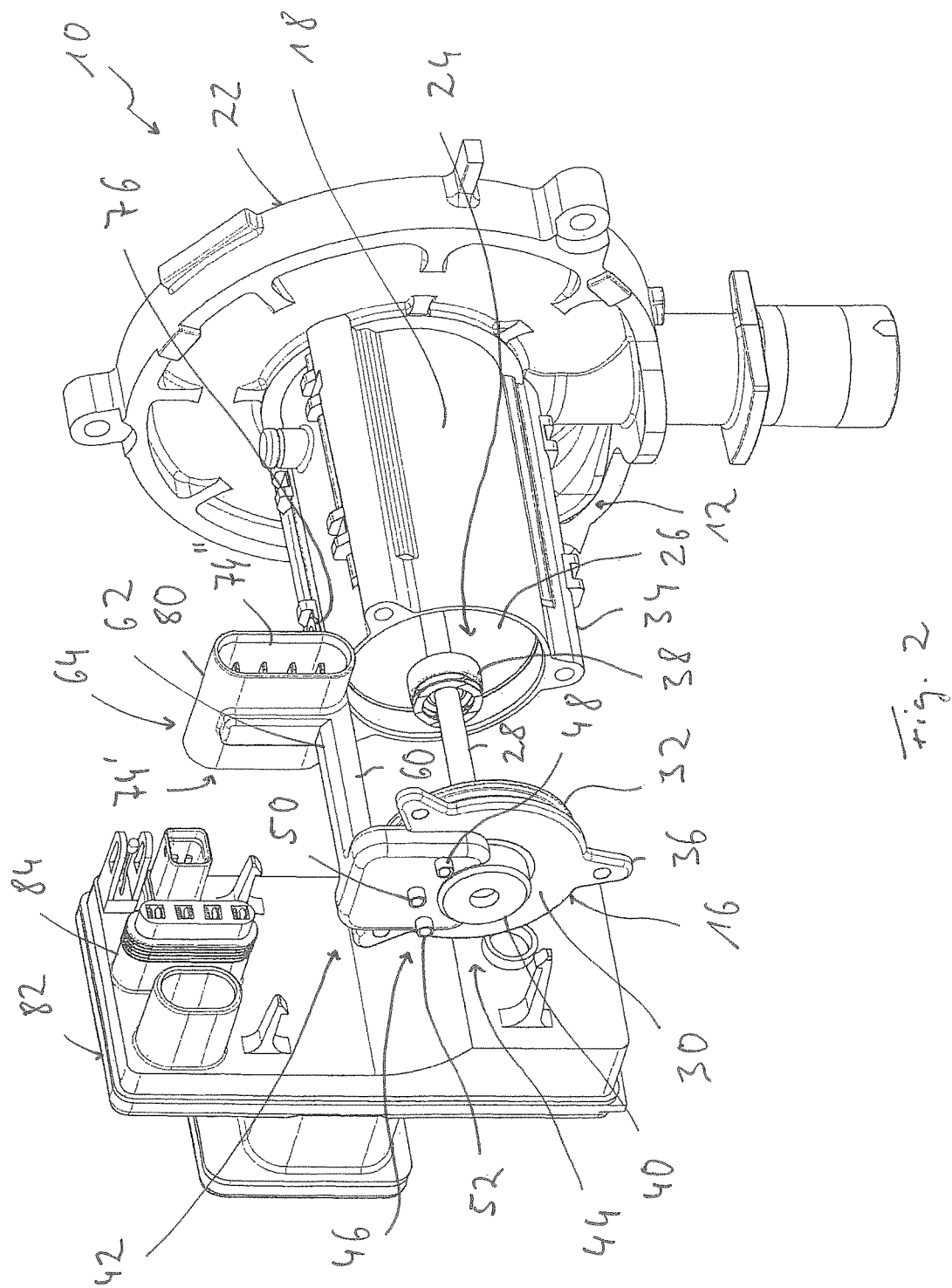
FIG. 2 is a perspective view showing the vehicle blower corresponding to FIG. 1 with a motor housing cover removed from a motor housing of a blower housing.
Figure 3:
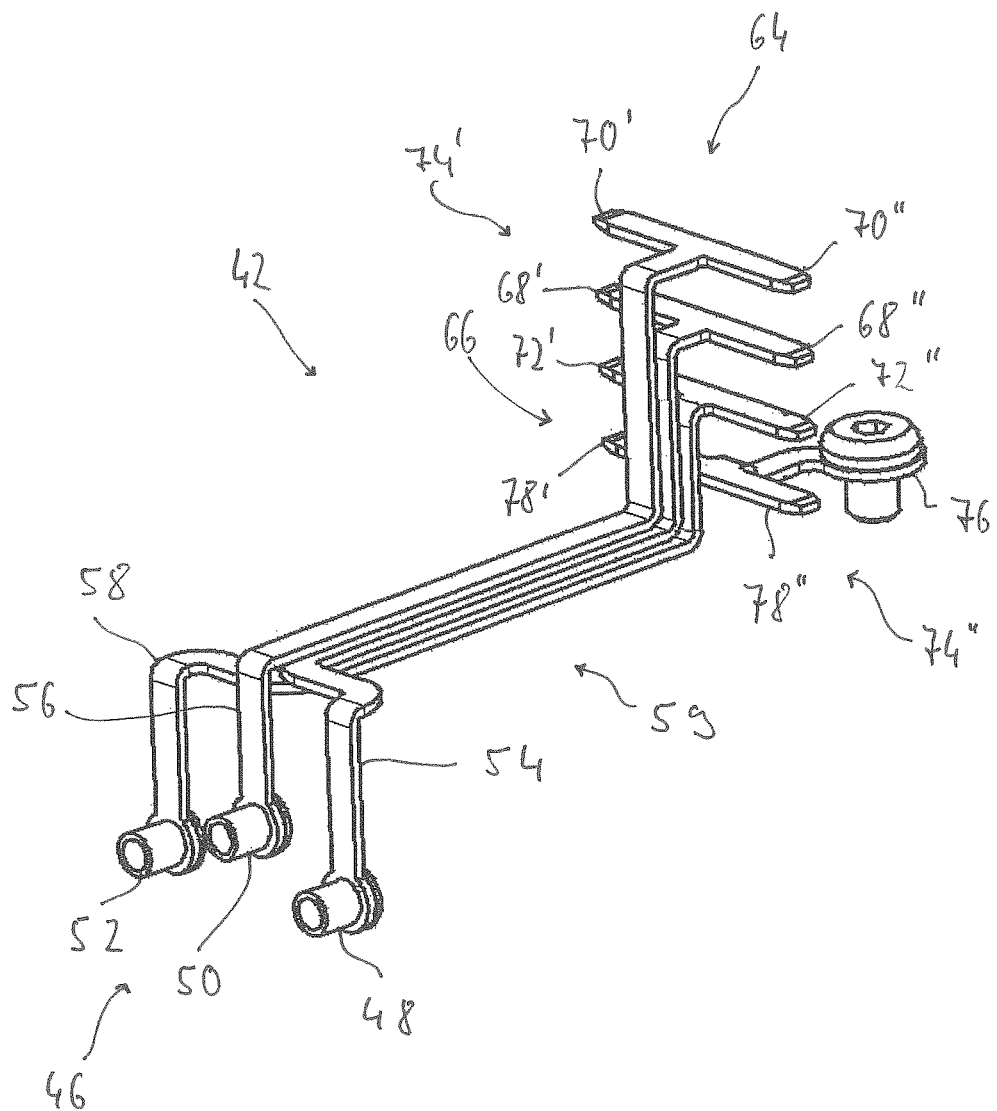
FIG. 3 is a perspective view showing electrically conductive assembly units of a contacting arrangement of the blower housing of the blower shown in FIGS. 1 and 2.

Referring to the drawings, FIGS. 1 and 2 show perspective views of a blower, which is generally designated with 10 and which is designed as a so-called side channel blower and can be used to deliver the combustion air needed for combustion with fuel in the direction towards a combustion chamber in a vehicle heater.

The blower 10 comprises a blower housing which is generally designated 12. The blower housing 12 comprises a motor housing 14 as well as a motor housing cover 16 to be connected to the motor housing 14. The motor housing 14 is constructed with a circumferential wall 18 and a first bottom area, which is generally designated with 22, at a first axial end area 20 of same. The circumferential wall 18 and the first bottom area 22 define an interior 24 of the motor housing 12, in which is accommodated an electric motor 26, which can be partially seen in FIG. 2. The electric motor 26 comprises a stator rigidly supported, for example, on the circumferential wall 18 as well as a rotor with a rotor shaft 28 rotatable about an axis of rotation, and this axis of rotation of the rotor shaft 28 may at the same time also correspond to a motor housing longitudinal axis D, along which the circumferential wall 18, which has, for example, an essentially cylindrical structure, extends.

The first bottom area 22 extends radially beyond the circumferential wall 18 in relation to the motor housing longitudinal axis D and provides a delivery channel extending in a ring-like manner about the motor housing longitudinal axis D. For example, in the radial extension area extending beyond the circumferential wall 18, the delivery channel is open toward an axial side 29 of the bottom area 22 which cannot be seen in the figures. A delivery wheel, which is likewise not shown in the figures, is supported at an end area of the rotor shaft 28 traversing the first bottom area 22 and overlaps the delivery channel with a delivery wheel delivery area having feed blades, such that with rotation of the delivery wheel, air is delivered with the buildup of pressure in the circumferential direction along the delivery channel and can leave this delivery channel in the area of an interrupter area.

For stability reasons, the motor housing 12 with circumferential wall 18 and the first bottom area 22 is preferably manufactured from metallic material, for example, aluminum in an aluminum die-casting process. The motor housing cover 16 closing the interior 26 of the motor housing 14 in the assembled state that can be seen in FIG. 1 is preferably made of plastic material, for example, as a plastic injection-molded part.

The motor housing cover 16 provides a second bottom area 30 closing the interior 26 essentially in the axial direction. A meshing area 32, extending in the direction of the motor housing longitudinal axis D and having an approximately cylindrical shape, which meshes with the circumferential wall 18 in the assembled state to ensure a closing of the interior 26, may project from this second bottom area. The motor housing cover 16 with connecting projections 36 projecting from the second bottom area 30 radially to the outside can be fastened using screw-type elements or the like to three connection areas 34 projecting radially to the outside and provided, for example, uniformly, i.e., at an angular distance of 120°, to one another on the circumferential wall 18. Because of the uniform circumferential spacing both of the connection areas 34 and of the connecting projections 36, it is possible to fasten the motor housing cover 16 to the motor housing 12 in a plurality of different positions. Of course, a different number of connection areas 34 and connecting projections 36 may be provided in this case in order to be able to also obtain a correspondingly different number of relative positions of the motor housing cover 16 in relation to the motor housing 12 accordingly.

The rotor shaft 28 of the electric motor 26 is preferably mounted rotatably both in the area of the first bottom area 22 traversed by same and in the area of the second bottom area traversed by same, for example, using corresponding bearings 38, for example, roller body bearings or slide bearings. For this, a recess receiving the bearing 38, which is formed in the bottom area 30 on an attachment 40, may be provided in the respective bottom area 22 or/and 30. In the end area of the rotor shaft 28 projecting to the left in FIG. 1 this rotor shaft can support an additional delivery wheel, so that not only the delivery wheel to be positioned opposite the first bottom area 22 rotates for the delivery of combustion air with the rotor shaft 28, but, for example, also a delivery wheel used for the delivery of hot air is driven by the rotor shaft 28 for rotation or rotates together with same.

A contacting arrangement, which is generally designated 42, is provided on the motor housing cover 16. In a first contacting area 44 provided in the area of the bottom area 30, the contacting arrangement 42 comprises a first contacting formation 46 for the electric contacting of the electric motor 26 arranged in the interior 24. The first contacting formation 46 comprises three contact elements 48, 50, 52, which, in the example shown, are constructed as plug contact elements with a bushing-like design and are especially also exposed on a side of the second bottom area 30 or of the housing cover 16 to be positioned facing the interior 24 of the motor housing 12 for establishing an electrically conductive connection with the electric motor 26. For example, corresponding motor contact elements, which are designed as plug contact pins, may be provided on an axial front side of the electric motor 26 and of the stator of same in association with the three contact elements 48, 50, 52. During the axial leading of the motor housing cover 16 to the motor housing 14, these plug contact pins may enter into the contact elements 48, 50, 52 with a bushing-like design, such that the electric connection of the contacting formation 46 to the electric motor 26 takes place thereby. In this case, the contact elements 48, 50, 52 may, but do not necessarily have to, be exposed toward the outside, i.e., away from the interior 24 of the motor housing 12. They may also be overlapped by the material of which the motor housing is made on the outer side of the motor housing cover 16.

The contacting arrangement 42 further comprises strip conductors 54, 56, 58, of a strip conductor formation 59, which lead away from the first contacting formation 46. These strip conductors 54, 56, 58 may be constructed, for example, by punching out of a plate blank as flat material conductors made of metallic material and may have a ring-like design in their end areas lying close to the first contacting formation 46 in order to press and thus also rigidly connect the contact elements 48, 50, 52, for example, into these end areas in an electrically conductive manner. The strip conductors 54, 56, 58 lead starting from the contact elements 48, 50, 52 first into the second bottom area 30 of the housing cover 16 essentially radially to the outside, i.e., away from the motor housing longitudinal axis D and then pass over into sections extending in a connection web 60 of the motor housing cover 16. These sections lie above one another at a distance that is small, but sufficient for an electrical insulation, i.e., radially staggered, and are embedded into the material of which the motor housing cover 16 is made, just as the sections leading radially away from the contact elements 48, 50, 52 and partially also the contact elements 48, 50, 52 themselves.

A second contacting area 64 of the contacting arrangement 42 is provided in an end area 62 of the connection web 60 at a distance from the second bottom area 30. The second contacting area 64 is exposed to the outside. To the outside means here outside of the interior 24 of the motor housing 12. A second contacting formation 64, which comprises two contact elements 68', 68", 70', 70", 72', 72" in association with each of the strip conductors 54, 56, 58 and thus in association with each contact element 48, 50, 52 of the first contacting formation 46, is provided in the second contacting area 64. These contact elements 68', 68", 70', 70", 72', 72" of the second contacting formation 64, which are each associated in pairs with a contact element 48, 50, 52 of the first contacting formation 46, extend away from one another in opposite directions, such that two contact plug areas 74' and 74" can be formed in the second contacting area 64. Three contact elements and plug contact elements 68', 70', 72' and 68", 70", 72" each lie above one another in each contact plug area 74', 74", i.e., radially staggered in relation to the motor housing longitudinal axis D. A ground contact 76 with ground contact elements 78', 78" provided in association with each contact plug area 74', 74" is also provided. A grounding of the motor housing 14 can be achieved via this ground contact 76, which can be connected, for example, by screw connection in an electrically conductive manner to the motor housing 14 made of metallic material.

The motor housing cover 16 is integral, i.e., provided as a block of material, with its second bottom area 30, the connection web 60 and the contact plug connection area 80 provided at the end area 62 of the connection web 60 and providing the contact plug areas 74', 74", which are designed as plug receptacles, for example. The electrically conductive components of the contacting arrangement 42, i.e., essentially the strip conductors 54, 56, 58 as well as partially the contact elements 48, 50, 52 and 68', 68", 70', 70", 72', 72" as well as also partially the ground contact 76 are embedded into the plastic material of which the housing cover 16 is made by means of plastic-metal composite technology. Thus, a structure, which can be produced in a simple manner, but which is also stable, is created. By preferably providing the connection web 60 extending along the circumferential wall 18 in the direction of the motor housing longitudinal axis D, the possibility is created to arrange the contact plug areas 74', 74" of the second contacting area 64 in the longitudinal central area of the circumferential wall 18, for example, such that an electrical connection can be established to an actuating device, which is not shown in the figures, in a simple manner, for example, by using a connector plug 82, which can be attached with a plug-in area 84 to one of the contact plug areas 74' or 74". Because of providing two contact plug areas 74', 74" pointing in opposite directions, the electrical connection of the connector plug 82 may take place here from two sides. In conjunction with the fact that the motor housing cover 16 can be fastened in three different positions in relation to the motor housing 12, there is thus a high variability in the spatial position also of the connector plug 82 or of a control device in relation to the blower 10.

While specific embodiments of the invention have been shown and described in detail to illustrate the application of the principles of the invention, it will be understood that the invention may be embodied otherwise without departing from such principles.

What is claimed is:

1. A blower housing for a vehicle heater, the blower housing comprising:
   a motor housing comprising a circumferential wall and a first bottom area in a first axial end area of the circumferential wall;
   a motor housing cover connected to the motor housing in a second axial end area of the circumferential wall and providing a second bottom area of the motor housing axially closing an interior of the motor housing and rotatably supporting a rotor shaft of a rotor of an electric motor accommodated in the interior of the motor housing;
   a contacting arrangement on the motor housing cover providing the second bottom area, the contacting arrangement for electrical contacting of the electric motor, the contacting arrangement comprising:
      a first contacting area with a first contacting formation at least on one side of the motor housing cover axially facing an interior of the motor housing and establishing an electric conductive connection with motor contact elements provided on an axial front side of a stator of the electric motor;
a second contacting area with a second contacting formation exposed to an outside; and
a strip conductor formation conductively connecting the first contacting formation to the second contacting formation.

2. The blower housing in accordance with claim 1, wherein the contacting arrangement is at least partially embedded in a material of which the motor housing cover is made, the first contacting formation comprising a contact element, the contact element extending parallel to a longitudinal axis of the rotor shaft.

3. The blower housing in accordance with claim 1, wherein:
the first contacting formation comprises a plurality of first contact elements,
the second contacting formation comprises second contact elements in association with each first contact element; and
the strip conductor formation, in association with each first contact element, comprises a strip conductor respectively connecting first contact elements with associated second contact elements, the strip conductor comprising a first strip conductor portion, a second strip conductor portion and a third strip conductor portion, the first strip conductor portion extending in a radial direction, relative to a longitudinal axis of the motor housing, from one of the first contact elements to a position located beyond the circumferential wall, the second strip conductor extending in an axial direction between the first strip conductor portion and the second strip conductor portion, the axial direction being parallel to the longitudinal axis, the third strip conductor portion extending in the radial direction, relative to the longitudinal axis of the motor housing, from one end of the second strip conductor portion to one of the second contact elements.

4. The blower housing in accordance with claim 3, wherein at least one of:
the strip conductor elements is formed integral with an associated one of the first contact elements; and
the strip conductor elements is formed integral with an associated one of the second contact elements by separating the strip conductor element out from a strip conductor material blank.

5. The blower housing in accordance with claim 3, wherein at least one of the first contact elements and the second contact elements comprises a plug contact element, the plug contact element extending in a direction traversing the longitudinal axis.

6. The blower housing in accordance with claim 1, wherein the motor housing cover comprises a connection web connecting the first contacting area to the second contacting area, the connection web extending along the circumferential wall at least in some areas with the housing cover mounted on the motor housing, the motor housing cover comprising an opening, wherein a portion of the rotor shaft is arranged in the opening.

7. The blower housing in accordance with claim 6, wherein the second contacting area comprises a contact plug connection area at an end area of the connection web and lying at a distance from the second bottom area.

8. The blower housing in accordance with claim 7, wherein the second bottom area of the motor housing cover is formed integral with the connection web and with the contact plug connection area.

9. The blower housing in accordance with claim 1, wherein the motor housing cover comprises a plastic-metal composite component, the motor housing cover comprising a motor housing cover element located axially opposite the electric motor with respect to a longitudinal axis of the rotor.

10. The blower housing in accordance with claim 1, wherein the motor housing cover can be connected to the motor housing in a plurality of mounting positions rotated in relation to one another about a motor housing longitudinal axis.

11. A motor vehicle blower comprising:
an electric motor with a stator and with a rotor, the rotor comprising a rotor shaft; and
a blower housing, the electric motor being arranged in the blower housing, the blower housing comprising:
a motor housing comprising a motor housing interior, a circumferential wall and a first bottom area in a first axial end area of the circumferential wall, the electric motor being arranged in the interior of the motor housing;
a motor housing cover connected to the motor housing in a second axial end area of the circumferential wall and providing a second bottom area of the motor housing axially closing the motor housing interior and rotatably supporting the rotor shaft;
a contacting arrangement on the motor housing cover providing the second bottom area, the contacting arrangement for electrical contacting the electric motor arranged in the blower housing, the contacting arrangement comprising:
a first contacting area with a first contacting formation at least on one side of the motor housing cover axially facing an interior of the motor housing and establishing an electric conductive connection with motor contact elements provided on an axial front side of the stator;
a second contacting area with a second contacting formation exposed to an outside; and
a strip conductor formation conductively connecting the first contacting formation to the second contacting formation.

12. The blower in accordance with claim 11, wherein:
the rotor shaft is mounted is at least one of mounted at the first bottom area and mounted at the second bottom area; and
the first contacting formation comprises a contact element, the contact element extending parallel to a longitudinal axis of the rotor shaft.

13. The blower in accordance with claim 11, wherein:
in the area of the first axial end area of the circumferential wall, the first bottom area extends radially beyond the circumferential wall in relation to a motor housing longitudinal axis:
a delivery channel extends in a ring-like manner about the motor housing longitudinal axis on an axial side of the first base wall facing away from the circumferential wall in the first base wall; and
a delivery wheel overlapping the delivery channel is supported on a rotor shaft traversing the first base wall.

14. The A blower in accordance with claim 11, wherein:
the first contacting formation comprises a plurality of first contact elements, the second contacting formation comprises second contact elements in association with each first contact element; and the strip conductor formation, in association with each first contact element, comprises a strip conductor respectively connecting first contact elements with associated second contact elements, the strip conductor comprising a first strip conductor portion, a second strip conductor portion and a third strip conductor portion, the first strip conductor portion extending in a radial direction, relative to a longitudinal axis of the motor housing, from one of the first contact elements to a position located beyond the circumferential wall, the second strip conductor extending in an axial direction between the first strip conductor portion and the second strip conductor portion, the axial direction being parallel to the longitudinal axis, the third strip conductor portion extending in the radial direction, relative to the longitudinal axis of the motor housing, from one end of the second strip conductor portion to one of the second contact elements.

15. The blower in accordance with claim 14, wherein at least one of:

the strip conductor elements is formed integral with an associated one of the first contact elements; and the strip conductor elements is formed integral with an associated one of the second contact elements by separating the strip conductor element out from a strip conductor material blank.

16. The blower in accordance with claim 14, wherein at least one of the first contact elements and the second contact elements comprises a plug contact element, the plug contact element extending in a direction traversing the longitudinal axis.

17. The blower in accordance with claim 11, wherein the motor housing cover comprises a connection web connecting the first contacting area to the second contacting area, the connection web extending along the circumferential wall at least in some areas with the housing cover mounted on the motor housing, the motor housing cover comprising an opening, wherein at least a portion of the rotor shaft extends through the opening.

18. The blower in accordance with claim 17, wherein:

the second contacting area comprises a contact plug connection area at an end area of the connection web and lying at a distance from the second bottom area; and the second bottom area of the motor housing cover is formed integral with the connection web and with the contact plug connection area.

19. The blower in accordance with claim 11, wherein the motor housing cover comprises a plastic-metal composite component, the motor housing cover comprising a motor housing cover element located axially opposite the electric motor with respect to a longitudinal axis of the rotor.

20. The blower in accordance with claim 11, wherein the motor housing cover can be connected to the motor housing in a plurality of mounting positions rotated in relation to one another about a motor housing longitudinal axis.

* * * * *